US012650384B2

(12) United States Patent
Kanamaru

(10) Patent No.: US 12,650,384 B2
(45) Date of Patent: Jun. 9, 2026

(54) METHOD OF PRODUCING STRESS-LUMINESCENT MATERIAL, METHOD OF PRODUCING STRESS-LUMINESCENT BODY, STRAIN MEASUREMENT METHOD, STRESS-LUMINESCENT BODY, STRESS-LUMINESCENT COATING MATERIAL, AND DEVICE FOR PRODUCING STRESS-LUMINESCENT BODY

(71) Applicant: SHIMADZU CORPORATION, Kyoto (JP)

(72) Inventor: Kuniaki Kanamaru, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 469 days.

(21) Appl. No.: 18/037,533

(22) PCT Filed: Oct. 18, 2021

(86) PCT No.: PCT/JP2021/038353
§ 371 (c)(1),
(2) Date: May 17, 2023

(87) PCT Pub. No.: WO2022/107522
PCT Pub. Date: May 27, 2022

(65) Prior Publication Data
US 2023/0417678 A1     Dec. 28, 2023

(30) Foreign Application Priority Data
Nov. 19, 2020     (JP) ................................. 2020-192220

(51) Int. Cl.
*G01N 21/70*     (2006.01)
*G01L 1/24*     (2006.01)
*G01N 3/32*     (2006.01)

(52) U.S. Cl.
CPC ............... *G01N 21/70* (2013.01); *G01N 3/32* (2013.01)

(58) Field of Classification Search
CPC . G01L 1/241; G01L 1/00; G01L 1/247; G01L 1/24; G01N 3/068; C09D 175/04; (Continued)

(56) References Cited

U.S. PATENT DOCUMENTS

| | | | | |
|---|---|---|---|---|
| 2006/0035079 A1* | 2/2006 | Xu | ...................... | C09K 11/7734 |
| | | | | 252/301.36 |
| 2008/0232083 A1 | 9/2008 | Xu | | |
| 2021/0312608 A1* | 10/2021 | Yokoi | ................... | G06T 7/0006 |

FOREIGN PATENT DOCUMENTS

| | | |
|---|---|---|
| CN | 1946828 A | 4/2007 |
| JP | 2005-144738 A | 6/2005 |

(Continued)

OTHER PUBLICATIONS

PCT Written Opinion of the International Searching Authority (Form PCT/ISA/237) dated Dec. 21, 2021 for PCT application PCT/JP2021/038353.

(Continued)

*Primary Examiner* — Brandi N Hopkins
(74) *Attorney, Agent, or Firm* — Muir Patent Law, PLLC

(57) ABSTRACT

A method of producing a stress-luminescent material according to one aspect of the present invention includes a preparation step of preparing a stress-luminescent material including monoclinic particles having a stress luminescence ability, and a pulverization step of pulverizing the stress-luminescent material while maintaining a crystal structure of the monoclinic particles.

15 Claims, 9 Drawing Sheets

(58) Field of Classification Search
CPC ....... F21K 2/04; C09K 11/0838; C09K 11/08;
C09K 11/64; C09K 11/7734; C09K
11/02; C09K 11/77348; C09K 11/7733;
G01B 11/16; G01B 11/165; B65D 5/00;
C04B 35/597; B82Y 30/00; C01G 33/00;
G01P 5/26; C01B 21/0602; H01L
2224/48091; H01J 63/06; H01J 11/12;
C23C 4/06; G06F 3/0421; B32B 37/24;
C08K 3/01
See application file for complete search history.

(56) References Cited

FOREIGN PATENT DOCUMENTS

| | | | |
|---|---|---|---|
| JP | 2009-092644 | A | 4/2009 |
| JP | 2015-075477 | A | 4/2015 |
| JP | 2016-098454 | A | 5/2016 |
| JP | 2016-211108 | A | 12/2016 |
| JP | 2017-094720 | A | 6/2017 |
| JP | 2018-163097 | A | 10/2018 |
| WO | 2005-097946 | A1 | 10/2005 |

OTHER PUBLICATIONS

Notice of Reasons for Refusal dated Feb. 27, 2024, in counterpart application No. JP 2022-563637.

Decision of Refusal for corresponding Japanese Patent Application No. 2022-563637 dated Jul. 2, 2024.

First Office Action dated Feb. 13, 2026, for corresponding application No. CN 202180077997.9.

* cited by examiner

METHOD OF PRODUCING STRESS-LUMINESCENT MATERIAL, METHOD OF PRODUCING STRESS-LUMINESCENT BODY, STRAIN MEASUREMENT METHOD, STRESS-LUMINESCENT BODY, STRESS-LUMINESCENT COATING MATERIAL, AND DEVICE FOR PRODUCING STRESS-LUMINESCENT BODY

TECHNICAL FIELD

The present invention relates to a method of producing a stress-luminescent material, a method of producing a stress-luminescent body, a strain measurement method, a stress-luminescent body, a stress-luminescent coating material, and a device for producing a stress-luminescent body.

BACKGROUND OF THE INVENTION

A technique is known for analyzing strain of a sample or a structure in which a stress-luminescent body is applied or mixed by measuring the strain of the stress-luminescent body based on the emission phenomenon of the stress-luminescent body (for example, see Japanese Unexamined Patent Application Publication No. 2015-75477 (Patent Document). The stress-luminescent body is a member that emits energy when the energy state is increased, and when a mechanical force is applied from the outside, it emits light according to the stress generated inside. Since the luminescence intensity (luminance) and the strain amount of the stress-luminescent body are correlated with each other, the strain of the strain-luminescent body can be measured from the luminance of the stress-luminescent body by imaging the stress-luminescent body by an imaging device.

PRIOR ART DOCUMENT

Patent Document

Patent Document 1: Japanese Unexamined Patent Application Publication No. 2015-75477

SUMMARY OF THE INVENTION

Problems to be Solved by the Invention

A stress-luminescent material contained in the stress-luminescent body is a material in which elements serving as an emission center are solid-dissolved in a skeleton of an inorganic crystal (base material). The typical example thereof includes strontium aluminate with europium added to the luminescence center. The stress-luminescent material is generally composed of ceramic particles having a particle diameter on the order of microns. Recently, stress-luminescent particles having a particle size of about 2 μm to about 3 μm have been synthesized.

However, as the particle diameter of the stress-luminescent particles to be synthesized decreases, the particles tend to aggregate. The cause of such particle aggregation is considered that the specific surface area of particles increases as the particle diameter decreases. As the stress-luminescent particles form aggregation, it becomes difficult to uniformly disperse the stress-luminescent particles in the stress-luminescent body. As a result, there is a concern that the measurement of the strain based on the luminescence intensity of the stress-luminescent body may be affected.

The present invention has been made to solve the above-described problems, and an object of the present invention is to provide a method of producing a stress-luminescent material capable of suppressing aggregation of stress-luminescent particles, a method of producing a stress-luminescent body, a strain measurement method, a stress-luminescent body, a stress-luminescent coating material, and a device for producing a stress-luminescent body.

Means for Solving the Problems

A method of producing a stress-luminescent material according to a first aspect of the present invention includes:

a preparation step of preparing a stress-luminescent material including monoclinic particles having a stress luminescence ability; and a pulverization step of pulverizing the stress-luminescent material while maintaining a crystal structure of the monoclinic particles.

A stress-luminescent body according to a second aspect of the present invention is a stress-luminescent body composed of a mixture of a stress-luminescent material and a solvent, wherein the stress-luminescent material includes monoclinic particles having a stress luminescence ability, the monoclinic particles being pulverized while maintaining a crystal structure.

A stress-luminescent coating material according to a third aspect of the present invention is a stress-luminescent coating material in which particles of stress-luminescent materials are dispersed in a base material, wherein the stress-luminescent material has an average particle diameter of 100 nm to 900 nm.

A device of producing a stress-luminescent body according to a fourth aspect of the present invention is a device of producing a stress-luminescent body, comprising:

a base configured to place a sample thereon;

a frame configured to be fixed to the base to face a surface of the sample; and a plate-like body configured to be stretched over the frame, the plate-like body including a plurality of through-holes penetrating in a thickness direction, the plurality of through-holes being arranged in a mesh shape;

a squeegee having a flat plate-like shape, the squeegee being configured to be movable on the plate-like body in a horizontal direction in a state in which a lower end portion of the squeegee is in linear contact with the plate-like body; and a supply member configured to supply a stress-luminescent coating material on a portion of the plate-like body in a traveling direction.

Effects of the Invention

According to the present invention, it is possible to provide a method of producing a stress-luminescent material capable of suppressing aggregation of stress-luminescent particles, a strain measurement method, a stress-luminescent body, a stress-luminescent coating material, and a device of producing a stress-luminescent body.

EMBODIMENTS FOR CARRYING OUT THE INVENTION

Hereinafter, some embodiments of the present invention will be described below with reference to the drawings. Note that in drawings, the same or corresponding part is assigned by the same reference symbol, and the description thereof will not be repeated.

<Method of Producing Stress-Luminescent Body>

The stress-luminescent body according to this embodiment is to be arranged on a predetermined region of a sample. The stress-luminescent material is a material that emits light upon mechanical stimulation of an externally applied force (e.g., compression, displacement, friction, or impact). In this specification, the term "stress-luminescent body" refers to a material obtained by molding a stress-luminescent material alone or in combination with another material (e.g., resin). The strain generated in the sample can be visualized by utilizing the luminescence phenomenon of the stress-luminescent body when a sample is stressed.

First, a method of producing a stress-luminescent body according to this embodiment will be described with reference to FIG. 1 to FIG. 9.

Figure 1:
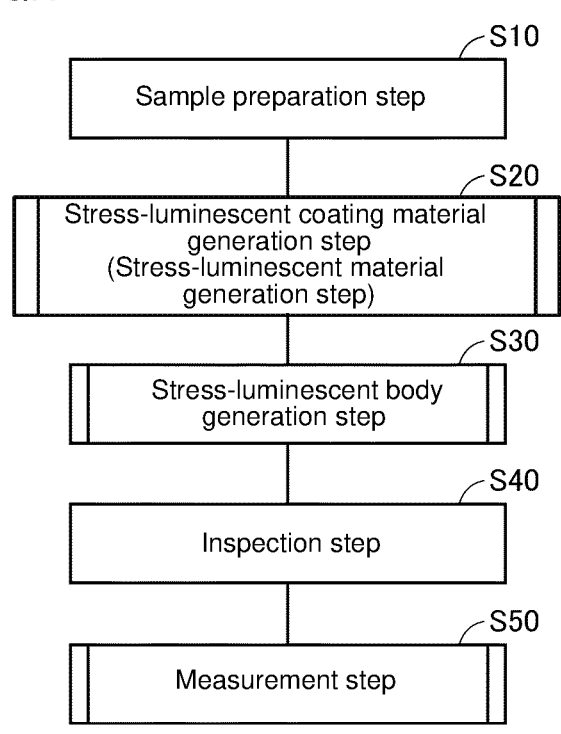
FIG. 1 is a flowchart for explaining a method of producing a stress-luminescent body according to one embodiment.

FIG. 1 is a flowchart for explaining a method of producing a stress-luminescent body according to this embodiment. As shown in FIG. 1, the method of producing a stress-luminescent body according to this embodiment mainly includes a sample preparation step (S10), a stress-luminescent coating material generation step (S20), a stress-luminescent body generation step (S30), and an inspection step (S40). A measurement step (S50) is a step of measuring the strain of the stress-luminescent body produced in Steps (S10) to (S40).

(1) Sample Preparation Step (S10)

First, a sample preparation step (S10) is performed. In this step (S10), a sample, which is a strain measurement target, is prepared. The sample is not particularly limited as long as it has a planar portion in the unstressed state. In this embodiment, it is assumed that the stress-luminescent body is used to measure the strain generated in the sample having flexibility.

The sample having flexibility is, for example, a flexible sheet or a flexible fiber. The flexible sheet may constitute, for example, a part of a flexible display or a wearable device of a communication terminal, such as, e.g., a smartphone and a tablet. The flexible fiber may constitute, for example, a part of a fiber optic cable. In this embodiment, the sample is a rectangular flexible sheet.

(2) Stress-Luminescent Coating Material Generation Step (S20)

Figure 2:
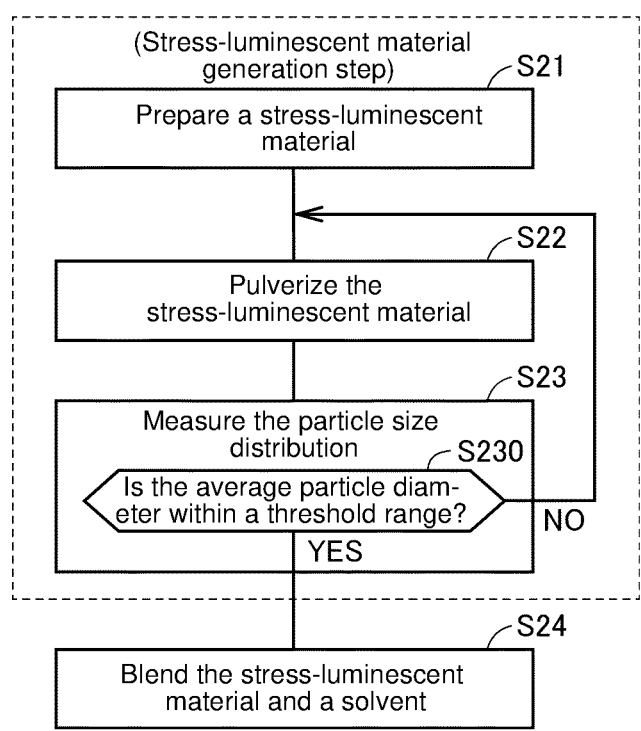
FIG. 2 is a flowchart for explaining the stress-luminescent coating material generation step (S20) shown in FIG. 1.

Next, a stress-luminescent coating material generation step (S20) is performed. In this step (S20), a stress-luminescent material is generated, and a coating material (hereinafter, also referred to as "stress-luminescent coating material") containing the generated stress-luminescent material is generated. FIG. 2 is a flowchart for explaining the stress-luminescent coating material generation step (S20) shown in FIG. 1.

As shown in FIG. 2, in the stress-luminescent coating material generation step (S20), a step of generating a stress-luminescent material is performed. In the step of generating a stress-luminescent material, first, a step (S21) of preparing a stress-luminescent material is performed. The stress-luminescent material is a material in which elements serving as an emission center are solid-dissolved in a skeleton of an inorganic crystal (base material), and the typical example thereof includes strontium aluminate doped with europium. Other examples include zinc sulfide doped with transition metals or rare earths, barium calcium titanate, and calcium yttrium aluminate. In this embodiment, a known stress-luminescent material can be used.

The stress-luminescent material is made of a base material selected from the group consisting of strontium aluminate, zinc sulfide, strontium stannate, and lithium niobate. The base material is activated by an ion of at least one element selected from the group consisting of Eu, Nd, Zr, Ho, Sc, Y, La, Ce, Pr, Pm, Sm, Er, Dy, Gd, Tm, Yb, Lu, and Tb.

Here, a typical stress-luminescent material is made of ceramics particles which are in powder form and have an average particle diameter of about 2 µm to about 3 µm and a particle size distribution of 1 µm to 10 µm. This is because, when a stress-luminescent material is generated with the aim of a particle diameter of a submicron order from the beginning, the crystal structure becomes not a monoclinic crystal having a stress luminescence ability but a cubic crystal having no stress luminescence ability. For this reason, since the particle diameter of the stress-luminescent material is on the order of microns, in the case of forming a sheet-like stress-luminescent body using a stress-luminescent material, it is difficult to set the film thickness to 10 µm or less. Note that, in this specification, the film thickness of the stress-luminescent body refers to the height of the stress-luminescent body in a direction perpendicular to the surface of the sample.

On the other hand, in order to evaluate the strain of a sample having a film thickness of several tens of µm, such as, e.g., a flexible sheet, the film thickness of the stress-luminescent body to be arranged on the sample is preferably ⅕ or less of a film thickness of the sample, more preferably ⅒ or less of the film thickness of the sample. The film thickness of the stress-luminescent body is preferably 2 µm or less.

This is because, when the film thickness of the stress-luminescent body is greater than ⅕ of the film thickness of the sample, the luminescence is derived from the strain generated in the strain-luminescent body when a force is applied to the sample. Further, when the film thickness of the stress-luminescent body becomes thick, the stress-luminescent body may suppress the force applied to the sample. Consequently, it becomes difficult to measure the strain generated in the sample.

Since the stress-luminescent material that can be expected to have a sufficient stress luminescence performance has a particle size on the order of microns, it is difficult to form a stress-luminescent body having an ideal film thickness of 2 μm or less. The present inventor conducted extensive researches on a method of producing a stress-luminescent material having a particle diameter on a submicron order, and found this embodiment with the following findings. Specifically, the present inventor has found the fact that even if particles having a stress luminescence function are pulverized, the crystal structure of the particles does not change, and the stress luminescence function is not impaired.

Furthermore, the present inventor has found the fact that, in synthesizing stress-luminescent particles, for a problem that as the particle diameter of stress-luminescent particles to be synthesized is reduced, particles tend to aggregate with each other, aggregation of the stress-luminescent material is suppressed in the stress-luminescent material pulverized by pulverization.

Figure 3:
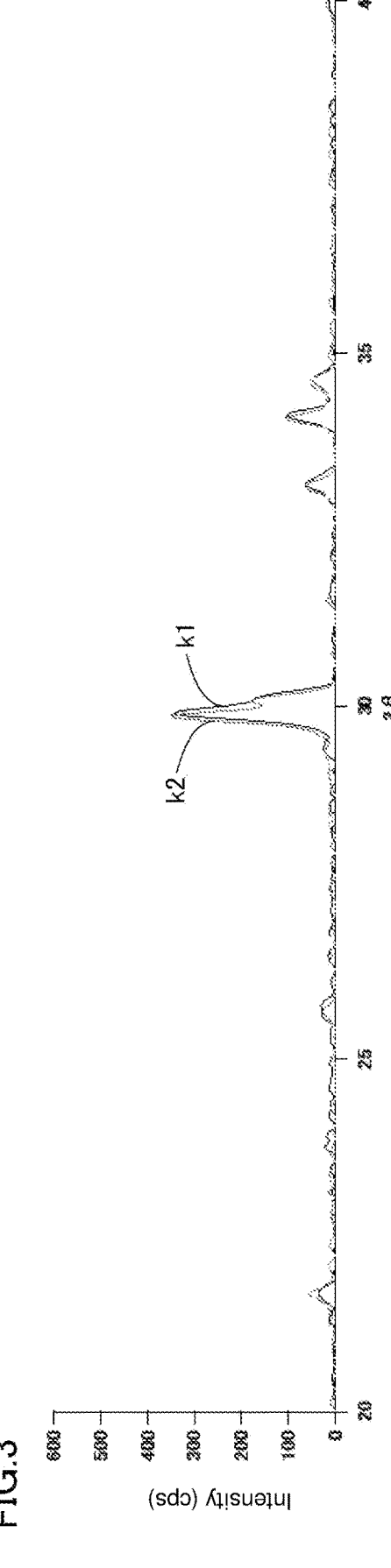
FIG. 3 is a diagram showing an analysis result of a stress-luminescent material subjected to a pulverization treatment.

FIG. 3 shows a result obtained by analyzing a crystal structure of a stress-luminescent material subjected to a pulverization treatment by X-ray diffraction (XRD). The stress-luminescent material serving as a sample is strontium aluminate ($SrAl_2O_4$) to which europium ($Eu_2O_3$) is added. The average particle diameter of the stress-luminescent material prior to the pulverization treatment was 3.3 μm. A stress-luminescent material was pulverized using a jet mill pulverizer. The average particle diameter of the stress-luminescent material after the pulverization treatment was 1.6 μm. Note that the average particle diameter refers to a particle diameter (D50) in which the cumulative volume is 50% of the total volume in a particle size distribution on a volume basis.

An X-ray diffractometer (device name: XRD-6100, manufactured by Shimadzu Corporation) was used for the measurement. The measurement condition was a tube: Cr (2.28970 Å), a tube voltage: 40 kV, a tube current: 40 mA, a scan rate: 1°/1 min, a step angle: 0.02°, and a scan angle range: 10 to 90° (2θ).

In FIG. 3, the waveform k1 indicates a diffraction pattern of a stress-luminescent material prior to a pulverization treatment, and the waveform k2 indicates a diffraction pattern of a stress-luminescent material after a pulverization treatment. Arrows in the figure indicate the peak positions derived from strontium aluminate. When the waveform k1 and the waveform k2 are compared, the peak positions and the intensities substantially coincide with each other. It was confirmed that the two diffracted patterns substantially coincide with each other even in an angular range of 2θ=40 to 90° (not shown). Thus, it is understood that the crystal structure of the stress-luminescent material is not changed before and after the pulverization treatment. That is, it can be seen that the crystal structure of stress-luminescent particles is a monoclinic crystal even after the pulverization.

Based on the above-described findings, the present inventor has found the step S22 of pulverizing a stress-luminescent material. Specifically, in the step (S22) of pulverizing a stress-luminescent material, the stress-luminescent material in the form of particles is pulverized while maintaining the crystal structure. In this step (S22), the particles of the stress-luminescent material are pulverized. The pulverization of the stress-luminescent material can be performed using a known pulverizing device, and the type thereof is not particularly limited.

However, the stress-luminescent material has low water resistance, and there is a possibility that the stress luminescence intensity deteriorates due to heating. Therefore, it is preferable to use a pulverizing device capable of pulverizing particles by colliding them at high speed.

For example, a wet pulverizer (device name: Laboster, manufactured by Ashizawa Finetech Co., Ltd.) can be used. This wet pulverizer pulverizes a sample by rotating a rotor in a chamber containing a beaded pulverizing medium and circulating a slurry-like sample in a chamber to collide with the medium.

Alternatively, a pulverizer (device name: Nanojet Mizer, manufactured by Aisin Nanotechnologies Co., Ltd.) can be used. This pulverizer accelerates particles by forming a concentric swirling vortex with a high-pressure jet stream inside a mill. Particles can be pulverized by the collision of the accelerated particles. At this time, it is possible to suppress the temperature rise of the object to be pulverized by the Joule-Thomson effect (temperature lowering effect at the time of atmospheric pressure-free expansion).

Note that the pulverization conditions are not particularly limited and may be set considering the particle size and the particle size distribution of the stress-luminescent material prior to the pulverization.

Next, a step (S23) of measuring the particle size distribution of the stress-luminescent material is performed. In this step (S23), the particle size distribution of the pulverized stress-luminescent material is measured using a known particle size distribution measuring device. As the particle size distribution measuring device, for example, a laser-diffraction/scattering particle size distribution device (device name: SALD-2300, manufactured by Shimadzu Corporation) can be used.

The laser diffraction/scattering particle size distribution device is configured to irradiate a stress-luminescent material housed in a measuring cell with light from a light source and receive the light diffracted or scattered by the stress-luminescent material by a plurality of light receiving elements. In the above-described configuration, the light strength distribution data representing the detection strength in each of the light receiving elements is obtained. By performing the calculation using the refractive index with respect to the acquired light intensity distribution data, it is possible to calculate the particle size distribution representing the particle amount in each particle diameter.

This step (S23) includes a step (S230) of determining whether the particle diameter of the stress-luminescent material is aligned with the desired particle diameter. Specifically, it is determined whether the average particle diameter is within a predetermined threshold range in a volume-based particle size distribution measured by a laser-diffraction/scattered particle size distribution device. In this specification, the average particle diameter refers to a particle size (D50) at which the cumulative volume is 50% of the total volume in the particle size distribution on a volume basis.

The threshold range in the step (S230) can be set according to a target value of the film thickness of the stress-luminescent body. For example, when the target value of the film thickness of the stress-luminescent body is 2 μm or less, the threshold range is preferably 100 nm to 900 nm.

When the average particle diameter (D50) of the stress-luminescent material is greater than the upper limit (900 nm)

of the threshold range, it is determined as NO in the step (S230), and the step (S22) is performed again. On the other hand, when it is determined that the average particle diameter (D50) is in the threshold range (100 nm to 900 nm), it is determined as YES in the step (S230), and the process proceeds to the next step (S24).

Next, the step (S24) of blending the stress-luminescent material and a solvent is performed. In this step (S24), the particles of the stress-luminescent material are blended with the solvent to produce a stress-luminescent coating material.

The solvent contains a film-forming resin. As the film-forming resin, a thermosetting resin, a room-temperature curable resin, an ultraviolet curable resin, a radiation effect resin, or the like can be used. Examples thereof include an epoxy resin, an acrylic resin, an alkyd resin, an urethane resin, a polyester resin, an amino resin, organosilica, and organotinetate. As a solvent, at least one capable of transmitting excitation light for exciting the stress-luminescent material and fluorescent light emitted from the stress-luminescent material can be used.

The solvent may optionally contain a coating additive, such as, e.g., a solvent, a dispersant, a filler, a thickener, a leveling agent, a curing agent, a pigment, a defoamer, an antioxidant, a light stabilizer including a UV absorber, a flame retardant, a curing catalyst, a germicide, and an antibacterial agent.

In Step (S24), the stress-luminescent material and the solvent are mixed by crushing the stress-luminescent material in a slurry dispersed in the solvent. The crushing method is not particularly limited, and for example, a roller mill, a ball mill, or the like can be used.

Figure 4:
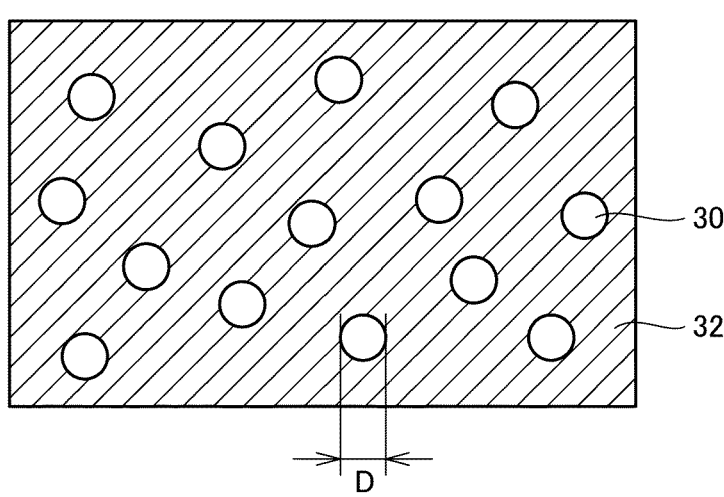
FIG. 4 is a diagram schematically showing a configuration of the stress-luminescent coating material generated in the step (S24) shown in FIG. 2.

FIG. 4 is a diagram schematically illustrating the structure of the stress-luminescent coating material generated in Step (S24). As shown in FIG. 4, in the stress-luminescent coating material, particles 30 composed of a plurality of stress-luminescent materials are distributed in a solvent 32 serving as a base. Note that the shape of the particles 30 is not particularly limited to a spherical shape. Since the aggregation of the particles 30 is suppressed by the step (S22) described above, the particles 30 can be uniformly dispersed in the solvent 32.

In the steps (S22, S23) described above, by pulverizing the stress-luminescent material based on the particle size distribution of the stress-luminescent material measured by a laser-diffraction-scattering method, the particle diameter D of the particles 30 dispersed in the solvent 32 is within a predetermined threshold range (e.g., 100 nm to 900 nm). Specifically, the average particle diameter (D50) of the sphere equivalent diameter (which refers to the diameter of the sphere having the same volume as the volume of particles 30) of particles 30 is in a predetermined threshold range (e.g., 100 nm to 900 nm).

Here, the grain spacing of the particles 30 is determined by the content of the stress-luminescent material in the stress-luminescent coating material. The grain spacing of the particles 30 corresponds to the shortest distance from one end face to the other end face of the adjacent particles 30.

The content of the stress-luminescent material in the stress-luminescent coating material can be appropriately adjusted so long as the flexibility of the stress-luminescent body is not impaired. For example, the stress-luminescent material can be 150 PHR (150 parts of a stress-luminescent material to 100 parts of a solvent, i.e., 60 weight %) with respect to the solvent containing the film-forming resin as a main component.

The blending ratio of the stress-luminescent material in the stress-luminescent coating material is preferably 20 weight % or more, more preferably 40 weight % or more, and even more preferably 50 weight % or more. When the blending ratio of the stress-luminescent material is less than 20 weight %, the grain spacing of particles 30 is increased, and it is concerned that the stresses applied to the stress-luminescent body escape into the solvent. As a result, the stress is less likely to be transmitted to the stress-luminescent material (i.e., the stress luminescence capability is reduced).

(3) Stress-Luminescent Body Generation Step (S30)

Next, a stress-luminescent body generation step (S30) is performed. In this Step (S30), a stress-luminescent body is formed on a predetermined region by applying the stress-luminescent coating material produced in the step (S20) to the predetermined region of the planar part of the surface of the sample. This predetermined region is set to include a region (i.e., a deformation region of the sample) to which stress is applied. Thus, when the sample is stressed, the stress-luminescent body is stressed integrally with the sample to cause deformation (strain).

Figure 5:
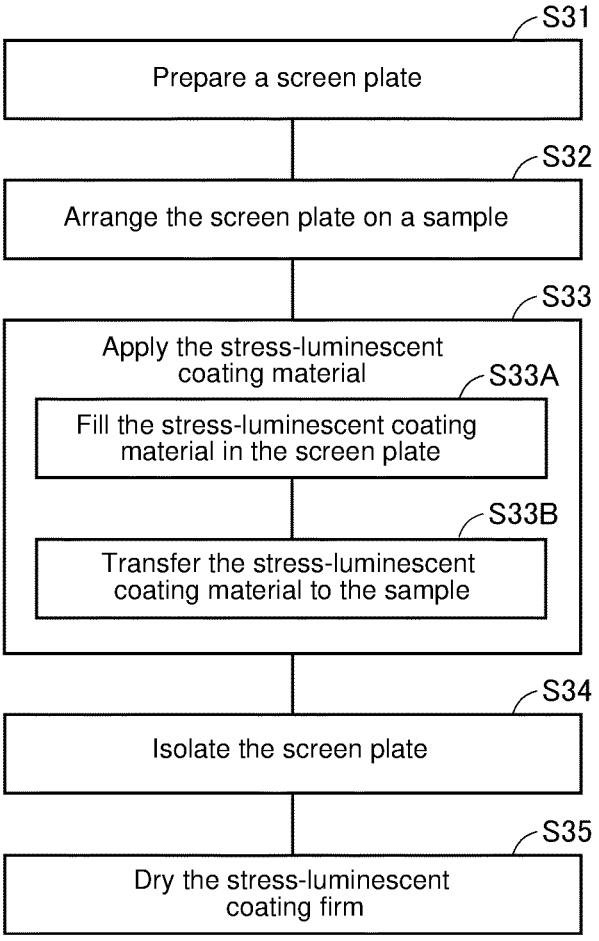
FIG. 5 is a flowchart for explaining the stress-luminescent body generation step (S30) shown in FIG. 1.

FIG. 5 is a flowchart for describing the stress-luminescent body generation step (S30) shown in FIG. 1. As shown in FIG. 5, in the stress-luminescent body generation step (S30), first, a step (S31) of preparing a screen plate is performed.

Figure 6:
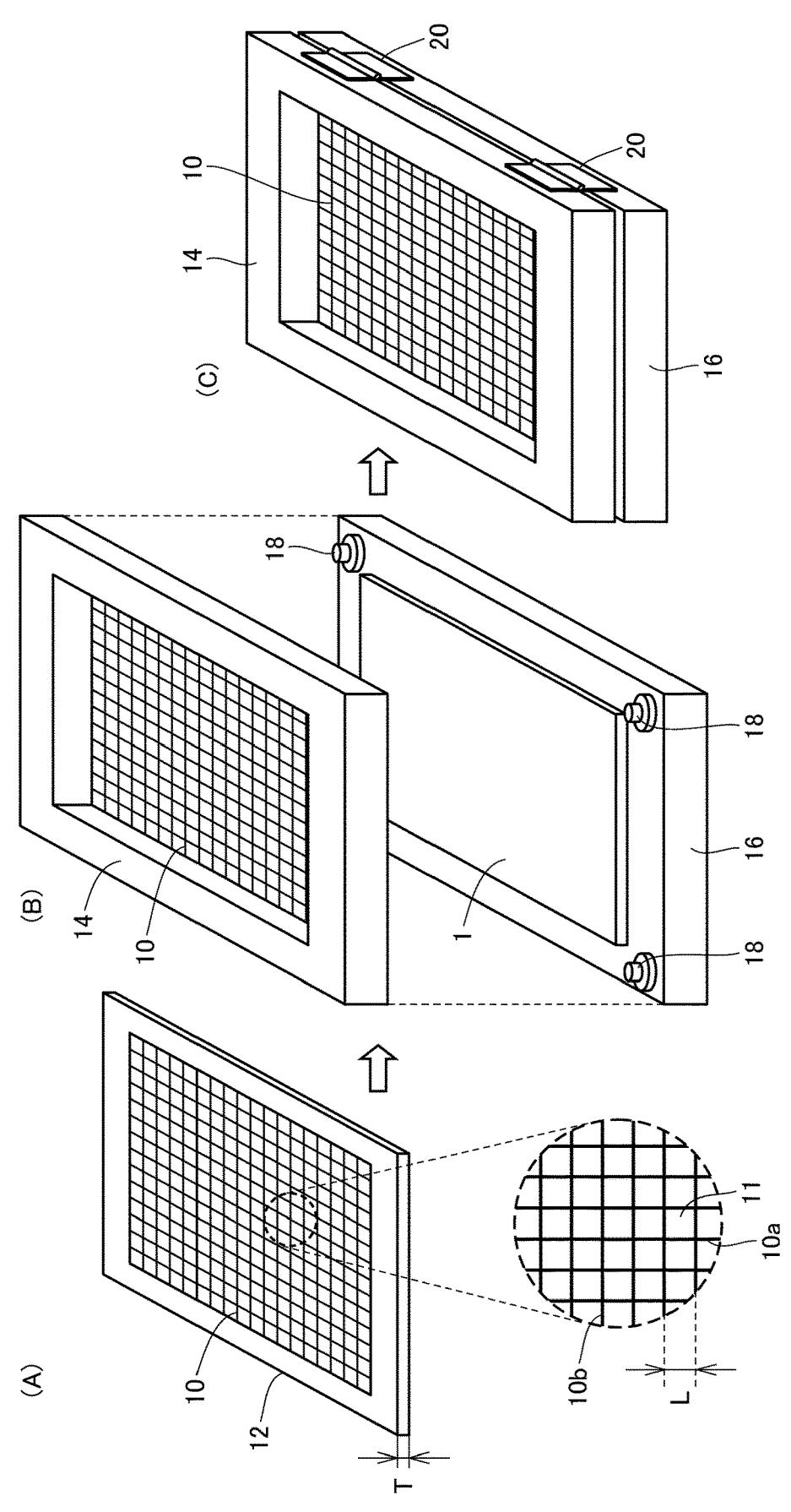
FIG. 6 is a schematic diagram for explaining the step (S31) shown in FIG. 5.

FIG. 6 is a schematic diagram for explaining the step (S31) shown in FIG. 5. In this step (S31), as shown in (A) of FIG. 6, a screen plate 10 in which a plurality of through-holes 11 is formed is prepared. The screen plate 10 has a thickness T. Each of the plurality of through-holes 11 penetrates the screen plate 10 in the thickness direction. That is, the length of the through-hole 11 in the thickness direction is equal to the thickness T of the screen plate 10. The screen plate 10 corresponds to one example of the "plate-like body."

The screen plate 10 has a rectangular shape, and the outer edge portion thereof is held and stretched on a frame 12 having a rectangular shape. Note that the shape of the screen plate 10 can be adjusted to match the shape of the predetermined region of the sample 1. Although the illustration is omitted, when the shape of the screen plate 10 is larger than the shape of the predetermined region of the sample 1, a mask can be arranged on the surface of the screen plate 10 so as to overlap with a region other than the predetermined region. This masking can cover the through-holes 11 located in a region other than the predetermined region.

The screen plate 10 has a two-dimensional mesh-like structure. The screen plate 10 can be formed, for example, by plain weave meshing consisting of a warp 10a and a weft 10b. Alternatively, the screen plate 10 may be formed by opening a plurality of through-holes 11 by etching a thin plate or the like. The thickness T of the screen plate 10 can be adjusted by the diameter of the warp 10a and the weft 10b or the thickness of the thin plate.

The plurality of through-holes 11 is arranged in a matrix according to the meshes of the screen plate 10. The shape of the opening of each through-hole 11 is not limited to a rectangular shape, and may have a circular or a polygonal shape.

In the example of (A) of FIG. 6, the warps 10a and the wefts 10b are arranged at a constant pitch, so that the opening of each through-hole 11 has a square shape with a side of L. The aperture ratio Ra of the screen plate 10 is generally represented by a space ratio (area ratio %) of a portion surrounded by the warps 10a and the wefts 10b and having no thread. Therefore, in (A) of FIG. 6, when the pitch of the warps 10a and that of the wefts 10b are constant, the length L of the side of the opening increases as the diameter of the warp line and that of the weft decrease, and therefore, the aperture ratio Ra increases.

Note that as the aperture ratio Ra of the screen plate 10 increases, the quantity of the stress-luminescent coating material filled in each through-hole 11 increases, so that the film thickness of the stress luminescence coating film becomes thicker. The film thickness of the luminescence coat film before drying can theoretically be determined by the product of the thickness T of the screen plate 10 and the aperture ratio Ra. That is, the film thickness of the stress-luminescent body can be adjusted by changing the thickness T and the aperture ratio Ra of the screen plate 10. Note that the film thickness of the stress-luminescent body can be adjusted by changing the boiling point and the viscosity of the stress-luminescent coating material, in addition to the thickness T and the aperture ratio Ra of the screen plate 10.

As described above, the film thickness of the stress-luminescent body is preferably ⅕ or less of the film thickness of the sample, more preferably 1/10 or less of the film thickness of the sample. The thickness T and the aperture ratio Ra of the screen plate 10 can be set by determining a target value of the film thickness of the stress-luminescent body in accordance with the film thickness of the sample and referring to the above-described relation based on the determined target value.

Next, a step (S32) of placing the screen plate 10 on the sample is performed. In this step (S32), as shown in (B) of FIG. 6, the sample 1 (rectangular flexible sheet) is placed on a base 16. A boss 18 (protrusion) is provided at each of four corners of the base 16.

The screen plate 10 is fixed to the printing frame 14 by joining the frame 12 and the printing frame 14. The printing frame 14 is arranged to face the base 16. A hole (not shown) is formed in the printing frame 14 at a position facing the boss 18 of the base 16. By arranging the printing frame 14 such that the boss 18 is fitted in the hole portion, the printing frame 14 can be fixed to the base 16 as shown in (C) of FIG. 6.

By fixing the printing frame 14 to the base 16, the screen plate 10 is placed in contact with the surface of the sample 1. By providing a hinge 20 for connecting the base 16 and the frame 14, the relative position of the screen plate 10 and the sample 1 can be easily adjusted when the step (S32) is performed every sample 1 even when the step (S30) is repeatedly performed on the plurality of samples 1.

Figure 7:
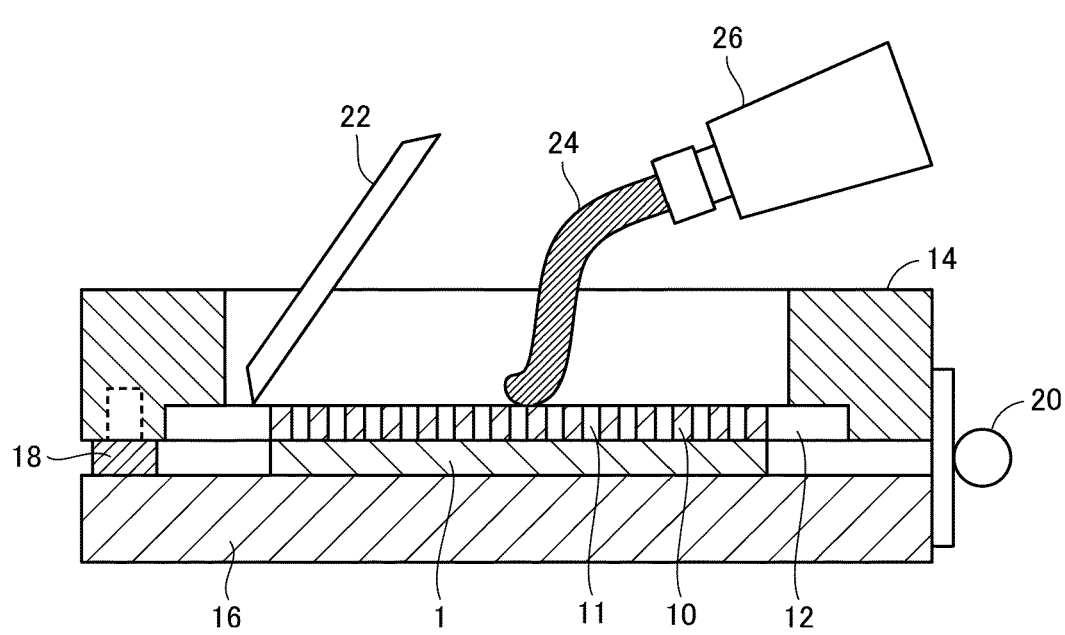
FIG. 7 is a schematic diagram for explaining the step (S33) shown in FIG. 5.
Figure 8:
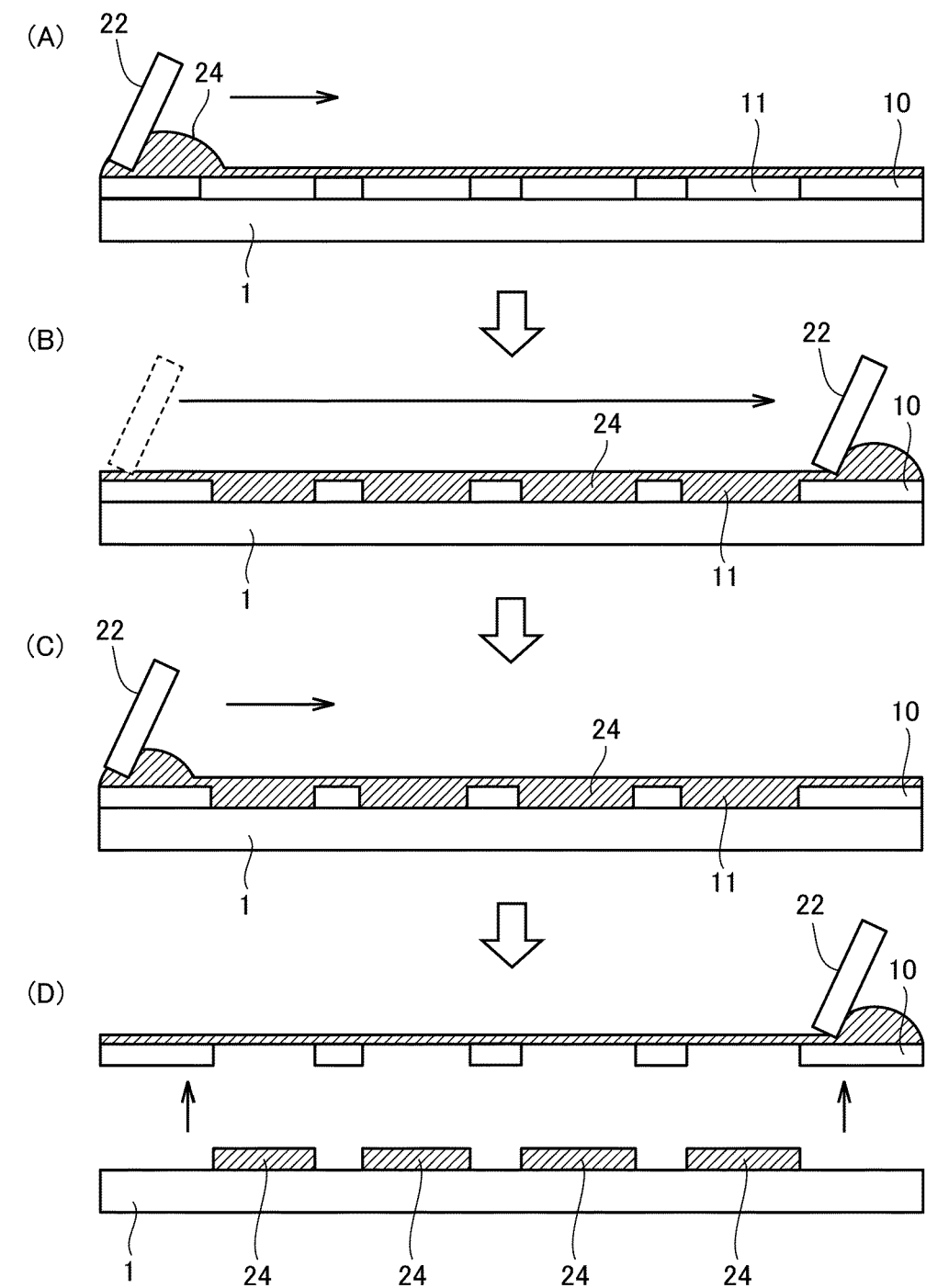
FIG. 8 is a schematic diagram for explaining the step (S33) shown in FIG. 5.

Next, a step (S33) of applying the stress-luminescent coating material to the predetermined region of the sample 1 via the screen plate 10 is performed. FIG. 7 and FIG. 8 are schematic diagrams for explaining the step (S33).

In this step (S33), first, a step (S33A) of filling the screen plate 10 with the stress-luminescent coating material is performed. As shown in FIG. 7, in a state in which the screen plate 10 is brought into surface contact with the surface of the sample 1, the stress-luminescent coating material 24 is supplied onto the screen plate 10. A squeegee 22 having an inclination with respect to the vertical direction is provided above the printing frame 14. The squeegee 22 has a flat plate-like shape, and its lower end portion is in line contact with the screen plate 10 (perpendicular to the plane of the paper). The squeegee 22 is configured to be able to move horizontally on the screen plate 10 (in FIG. 7 and FIG. 8, from the left side to the right side of the paper surface) in this state.

The stress-luminescent coating material 24 is supplied to a portion of the screen plate 10 in the traveling direction of the squeegee 22. For example, as shown in FIG. 7, a supply device, such as nozzle 26, for supplying the stress-luminescent coating material is provided in front of the squeegee 22 in the traveling direction, and the nozzle 26 is moved together with the movement of the squeegee 22, whereby the stress-luminescent coating material can be supplied.

Next, as shown in (A) and (B) of FIG. 8, each through-hole 11 of the screen plate 10 is filled with the stress-luminescent coating material 24 by horizontally moving the squeegee 22 on the screen plate 10 in a state in which the squeegee 22 is in contact with the screen plate 10.

Subsequently, a step (S33B) of transferring the stress-luminescent coating material 24 filled in the screen plate 10 onto the sample 1 is performed. As shown in (C) of FIG. 8, the squeegee 22 is moved horizontally on the screen plate 10 in a state in which the squeegee 22 is in contact with the screen plate 10. Since the surface of the sample 1 and the screen plate 10 are in surface contact with each other, the bottom of the stress-luminescent coating material 24 filled in each through-hole 11 contacts the surface of the sample 1. With this, the stress-luminescent coating material 24 is attached (applied) to the surface of the sample 1 in each through-hole 11.

Figure 9:
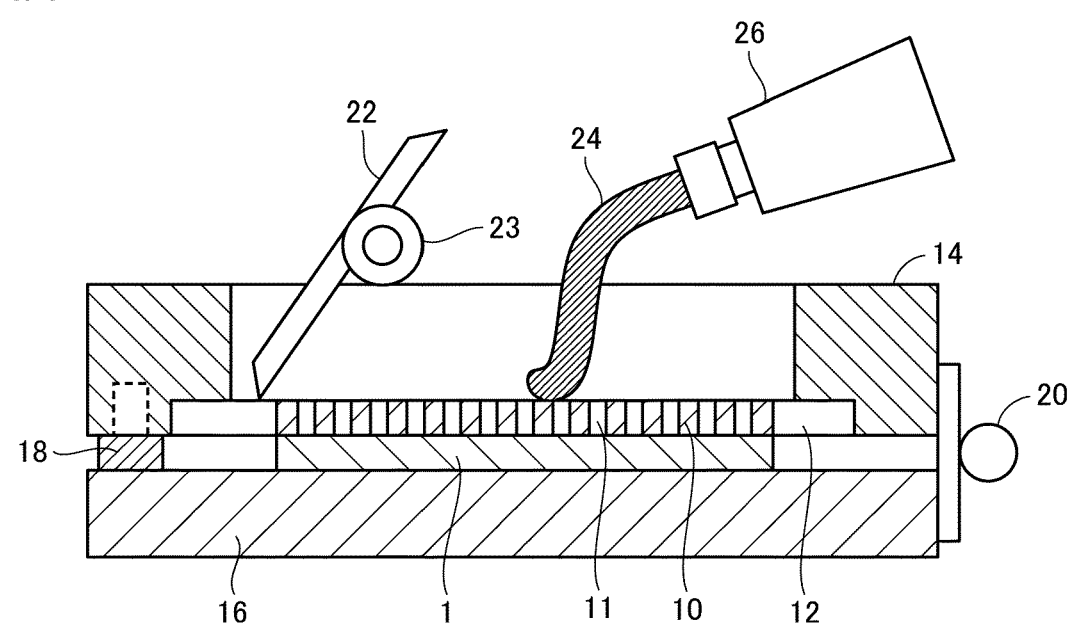
FIG. 9 is a schematic diagram for explaining the step (S33) shown in FIG. 5.

Note that by repeatedly performing the operation of moving the squeegee 22 on the screen plate 10, it is possible to increase the uniformity of the filling amount of the stress-luminescent coating material 24 to each through-hole 11. As shown in FIG. 9, a rotating member 23 may be provided to restrict the moving direction of the squeegee 22 horizontally to the screen plate 10, so that each through-hole 11 can be uniformly filled with the stress-luminescent coating material 24 by a non-skilled person.

By making the filling amount of the stress-luminescent coating material 24 to each through-hole 11 uniform, the amount of the stress-luminescent coating material 24 to adhere to the surface of the sample 1 corresponding to each through-hole 11 can be made uniform. As a result, the uniformity of the film thickness of the stress-luminescent body can be enhanced. The screen plate 10, the base 16, the frames 12, 14, the squeegee 22, and the nozzle 26 constitute one example of the "device of producing a stress-luminescent body."

Next, a step (S34) of detaching the screen plate 10 from the surface of the sample 1 is performed. In this step (S34), as shown in (D) of FIG. 8, the printing frame 14 is moved above the base 16 (or the base 16 is moved below the printing frame 14), thereby detaching the screen plate 10 from the surface of the sample 1. As a result, the stress-luminescent coating material 24 filled in each through-hole 11 is removed from the screen plate 10 and transferred onto the sample 1. By bonding the adjacent stress-luminescent coating materials 24 to each other by the surface tension, a stress luminescence coating film having a uniform film thickness is formed on the predetermined region of the surface of the sample 1.

Next, a step (S35) of drying the luminescence coat film is performed. In this step (S35), the solvent and water in the solvent are evaporated by being dried, so that the luminescence coating film is cured. Consequently, a stress-luminescent body 2 of a thin film is formed on the front surface of the sample 1. The drying conditions can be determined depending on the curing temperature of the resin used and the temperature resistance of the sample 1. For example, in the case of an amine curing agent-based epoxy resin, the drying temperature can be set to about room temperature to 60° C. In the case of an acid anhydride curing agent-based epoxy resin, the drying temperature can be set to about 125° C. to about 170° C.

Figure 10:
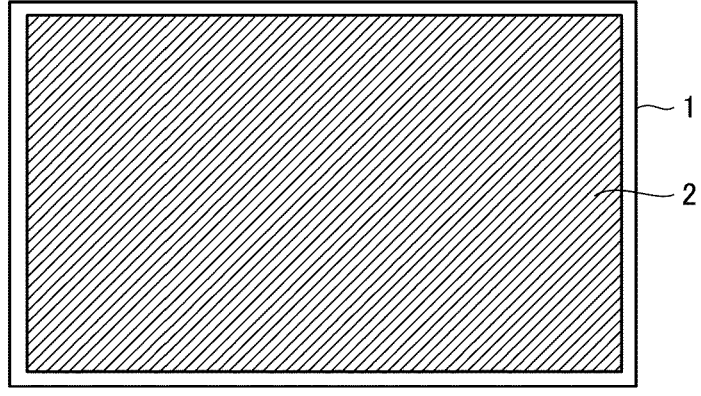
FIG. 10 is a plan view schematically showing a sample on which a stress-luminescent body is formed.

FIG. 10 is a plan view schematically showing the sample 1 on which the stress-luminescent body 2 is formed. As shown in FIG. 10, the stress-luminescent body 2 of a thin film is arranged on the predetermined region of the sample 1. As described above, the stress-luminescent body 2 in close contact with the surface of the sample 1 is deformed (strained) by being applied by a force integrally with the sample 1, and therefore has the same strain distribution as that of the surface of the sample 1. In the stress-luminescent body 2, the luminescence intensity increases as the applied force increases. Therefore, it is possible to visualize the state of the strain (stresses) generated in the sample 1 from the luminescence intensity of the stress-luminescent body 2.

(4) Inspection Step (S40)

Next, an inspection step (S40) is performed. In this step (S40), the film thickness of the stress-luminescent body 2 arranged on the surface of the sample 1 is measured.

A scanning probe microscopy (SPM) can be used to measure the film thickness of the stress-luminescent body 2. Among them, by using an atomic force microscope (AFM) having a resolution of a nano-order level, it is possible to three-dimensionally measure the shape of the stress-luminescent body 2 arranged on the surface of the sample 1. As the atomic force microscope, for example, (device name: SPM-9700HT, manufactured by Shimadzu Corporation) can be used. The film thickness of the stress-luminescent body 2 can be determined by the arithmetic mean of a sufficient number of film thickness measurements. For the measurement of the film thickness of the stress-luminescent body 2, a three-dimensional measuring device, a surface roughness meter, or the like can be used in addition to the above-described SPM.

In the inspection step (S40), it is determined whether the measured film thickness of the stress-luminescent body 2 is within a predetermined film thickness range. The film thickness range in this step (S40) corresponds to the target value of the film thickness of the stress-luminescent bod 2 and can be set according to the film thickness of the sample 1. The film thickness range in the step (S40) is preferably ⅕ or less of the film thickness of the sample 1, more preferably ¹⁄₁₀ or less of the film thickness of the sample 1. Further, the film thickness is preferably 1 μm or more. This is because when the film thickness of the stress-luminescent body 2 is less than 1 stress luminescence intensity that is enough to measure the strain cannot be obtained.

For example, in a case where the film thickness of the sample 1 is about 10 the film thickness range in the step (S40) may be set to 1 μm to 2 μm.

When the measurement value of the film thickness of the stress-luminescent body 2 is larger than the upper limit value or smaller than the lower limit value of the film thickness range, the stress-luminescent body 2 is determined to be inappropriate, and is excluded from the measurement target together with the sample 1. On the other hand, when it is determined that the measured film thickness of the stress-luminescent body 2 is within the film thickness range, it is determined that the measured value is normal in the inspection step (S40), and the process proceeds to the next step (S50).

As described above, according to the method of producing a stress-luminescent material according to this embodiment, monoclinic particles having a stress luminescence capacity are pulverized without changing the crystal structure. With this, a stress-luminescent body 2 having a film thickness of 10 μm or less and capable of exhibiting a high stress luminescence capability can be formed on the surface of the sample 1. In particular, by adjusting the average particle diameter (D50) of the stress-luminescent material to 100 nm to 900 nm, the film thickness of the stress-luminescent body 2 can be set to 2 μm or less. In addition, since aggregation of particles is suppressed in the pulverized stress-luminescent material, it is possible to form a homogeneous stress-luminescent body 2.

Further, according to the method of producing a stress-luminescent body according to this embodiment, a stress-luminescent body 2 having a uniform film thickness can be easily formed on the surface of the sample 1 by performing the step (S30) of applying the stress-luminescent coating material to the surface of the sample 1 using the screen plate 10 having a two-dimensional mesh-like structure.

Furthermore, according to the method of producing a stress-luminescent body according to this embodiment, the film thickness of the stress-luminescent body 2 to be formed on the surface of the sample 1 can be easily adjusted by the thickness T and the aperture ratio Ra of the screen plate 10 having a two-dimensional mesh-like structure. Specifically, by reducing the thickness T of the screen plate 10 and/or reducing the aperture ratio Ra of the screen plate 10, the film thickness of the stress-luminescent body 2 can be reduced.

That is, according to the method of producing a stress-luminescent body according to this embodiment, the particle diameter of the stress-luminescent material contained in the stress-luminescent coating material is adjusted to a submicron order. Further, the thickness T and the aperture ratio Ra of the screen plate 10 having a two-dimensional network are adjusted. This makes it possible to form a stress-luminescent body 2 having a uniform film thickness of 2 μm or less on the surface of the sample 1 and having a high stress luminescence capability. In the following measurement step (S50), the strain of the sample 1 is measured using the luminescence phenomenon of the stress-luminescent body 2.

(5) Measurement Step (S50)

Next, a measurement step (S50 of FIG. 1) will be described with reference to FIG. 11 to FIG. 14.

In the measurement step (S50), the strain of the stress-luminescent body 2 when stressed is measured using the luminous phenomenon of the stress-luminescent body 2. The luminescence of the stress-luminescent body 2 can be measured using, for example, a stress luminescence measurement device 100 shown in FIG. 11.

Configuration Example of Stress Luminescence Measurement Device

Figure 11:
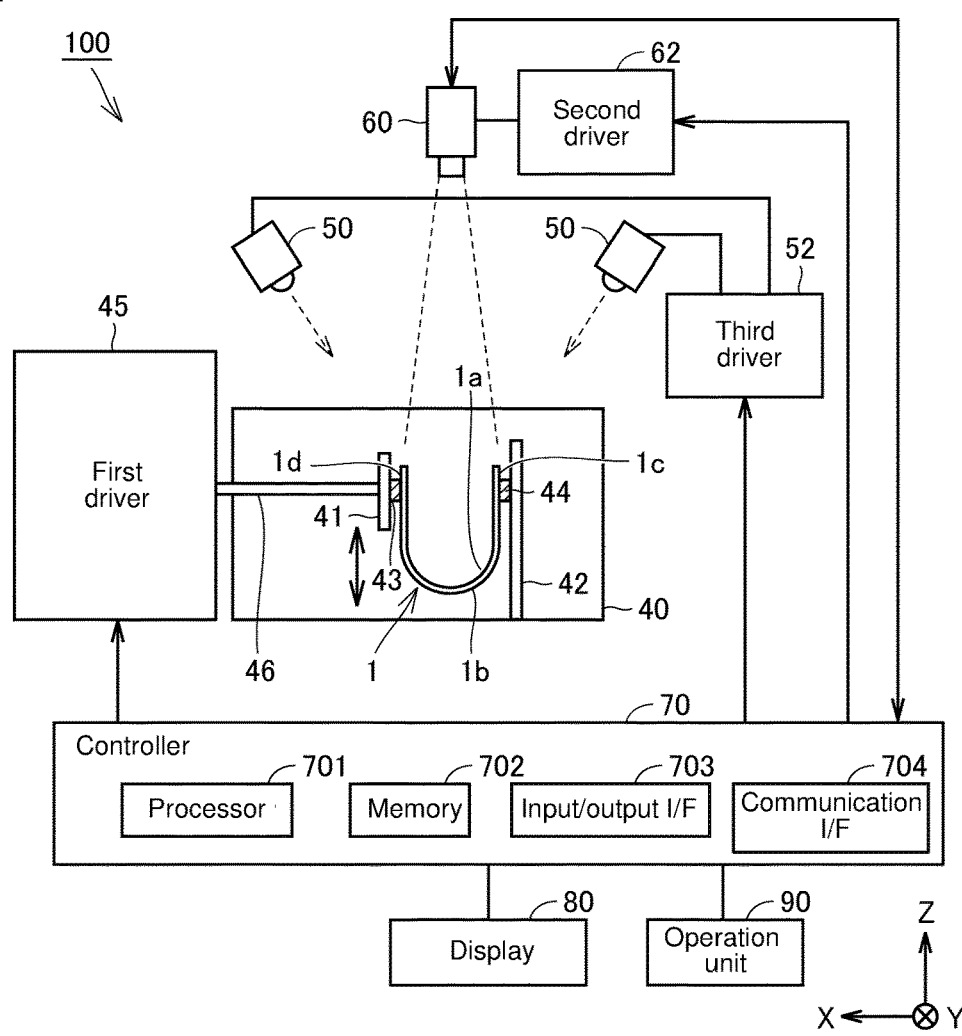
FIG. 11 is a block diagram showing a configuration example of a stress luminescence measurement device used in the measurement step (S50) shown in FIG. 1.

FIG. 11 is a block diagram showing a configuration example of a stress luminescence measurement device 100 used for the measurement step (S50). In the example of FIG. 11, the stress luminescence measurement device 100 is configured to measure the luminescence of the stress-luminescent body 2 when a bending stress is applied to the sample 1.

Specifically, the stress luminescence measurement device 100 is provided with a holder 40 for supporting the sample 1, a light source 50, a camera 60, a first driver 45, a second driver 62, a third driver 52, and a controller 70.

The holder 40 is configured to support the sample 1 by contacting at least two points of the sample 1. In the example of FIG. 11, the holder 40 is configured to support the opposed first end 1c and second end 1d of the sample 1. Specifically, the holder 40 includes a fixed wall 42, a moving wall 41, and connection members 43 and 44. In FIG. 11, in a state in which the holder 40 is placed, the width direction is referred to as an X-axis direction, the depth direction is referred to as a Y-axis direction, and the height direction is referred to as a Z-axis direction.

The fixed wall 42 and the moving wall 41 are arranged to face each other in the X-axis direction. The fixed wall 42 is secured to the bottom surface of the holder 40. On the other hand, the moving wall 41 is configured to move in the Z-axis direction (up and down in the drawing) by receiving an external force from the first driver 45.

The first end 1c of the sample 1 is connected to the fixed wall 42 by the connection member 44. The second end 1d of the sample 1 is connected to the moving wall 41 by the connection member 43. The sample 1 is set to the holder 40 in a state of being bent in a U-shape. By changing the distance between the fixed wall 42 and the moving wall 41 in the X-axis direction, the bending radius of the sample 1 can be adjusted.

The first driver 45 is connected to the holder 40 and is configured to move the moving wall 41 between a "first holder position" and a "second holder position" so that the relative position of the first end 1c and the second end 1d can be changed. The first driver 45 is connected to the moving wall 41 and has an actuator 46 for reciprocally moving the second end 1d of the sample 1 in the Z-axis direction.

The first driver 45 can periodically move the moving wall 41 by periodically operating the actuator 46. To be specific, the first driver 45 moves the moving wall 41 from the first holder position to the second holder position in the first half of one operation cycle of the holder 40. Also, the first driver 45 can move the moving wall 41 from the second holder position to the first holder position in the second half of one operation cycle of the holder 40.

The sample 1 is supported by the holder 40 such that the first surface 1a faces upward. The predetermined region of the first surface 1a is coated with the stress-luminescent body 2 (see FIG. 10). Light sources 50 are arranged above the sample 1 in the Z-axis direction and are configured to irradiate the stress-luminescent body 2 on the first surface 1a of the sample 1 with excitation light. Upon receiving the excitation light, the stress luminescent body 2 transitions to the light-emitting state. The excitation light is, for example, UV or infrared-ray. Note that in the example of FIG. 11, although it is configured such that the first surface 1a of the sample 1 is irradiated with the excitation light from two directions, the sample 1 may be irradiated with excitation light from one direction or three or more directions.

The third driver 52 supplies power to the drive light sources 50. The third driver 52 can control the amount of the excitation light emitted from the light sources 50 and the irradiation time of the excitation light by controlling the power supplied to the light sources in response to the command received from the controller 70.

The camera 60 is arranged above the sample 1 in the Z-axis direction to include at least the predetermined region of the first surface 1a in the imaging field of view. Specifically, the camera 60 is arranged such that the focus position is located at at least one point in the predetermined region of the first surface 1a. Preferably, at least one point in the predetermined region is located at the central part of the bending of the sample 1.

The camera 60 includes optics, such as, e.g., a lens and an imaging element. The imaging element is realized by, for example, a CCD (Charge Coupled Device) sensor, a CMOS (Complementary Metal Oxide Semiconductor) sensor, or the like. The imaging element generates a captured image by converting the light incident on the first surface 1a via the optics into an electric signal.

The camera 60 is configured to image the luminescence of the stress-luminescent body 2 on the first surface 1a when at least stress is applied to the sample 1. The image data generated by the imaging of the camera 60 is transmitted to the controller 70.

The second driver 62 is configured to change the focus position of the camera 60 in response to the command received from the controller 70. Specifically, the second driver 62 can adjust the focus position of the camera 60 by moving the camera 60 along the Z-axis direction. For example, the second driver 62 is provided with a motor for rotating a feed screw that moves the camera 60 in the Z-axis direction, and a motor driver for driving the motor. When the feed screw is rotationally driven by the motor, the camera 60 is positioned at a specified position within the predetermined range in the Z-axis direction. Further, the second driver 62 transmits the positional information indicating the position of the camera 60 to the controller 70.

The controller 70 controls the entire stress luminescence measurement device 100. The controller 70 includes, as main components, a processor 701, a memory 702, and an input/output interface (I/F) 703 and communication (I/F) 704. These units are communicably connected to each other via a bus (not shown).

The processor 701 is typically an arithmetic processor, such as, e.g., a CPU (Central Processing Unit) and an MPU (Micro Processing Unit). The processor 701 controls the operation of each unit of the stress luminescence measurement device 100 by reading and executing programs stored in the memory 702. Specifically, the processor 701 implements each processing of the stress luminescence measurement device 100, which will be described later, by executing programs. In the example of FIG. 11, a configuration in which the processor is singular is exemplified, but it may be configured such that the controller 70 includes a plurality of processors.

The memory 702 is realized by a non-volatile memory, such as, e.g., a RAM (Random Access Memory), a ROM (Read Only Memory), and a flash memory. The memory 702 stores programs to be executed by the processor 701, or data to be used by the processor 701.

The input/output I/F 703 is an interface for exchanging various data between the processor 701, the first driver 45, the third driver 52, the camera 60, and the second driver 62.

The communication I/F 704 is a communication interface for exchanging various data between the stress luminescence measurement device 100 and other devices, and is realized by an adaptor, a connector, or the like. The communication method may be a wireless communication method using a wireless LAN (Local Area Network) or the like, or may be a wired communication method using a USB (Universal Serial Bus) or the like.

A display 80 and an operation unit 90 are connected to the controller 70. The display 80 is configured by a liquid crystal display capable of displaying images. The operation unit 90 accepts a user manipulation input to the stress luminescence measurement device 100. The operation unit 90 is typically configured by a touch panel, a keyboard, a mouse, and the like.

The controller 70 is communicatively connected to the first driver 45, the third driver 52, the camera 60, and the second driver 62. The communication between the controller 70, the first driver 45, the third driver 52, the camera 60, and the second driver 62 may be realized by radio communication, or may be realized by wire communication.

Next, a measurement step (S50) using the stress luminescence measurement device 100 shown in FIG. 11 will be described.

Figure 12:
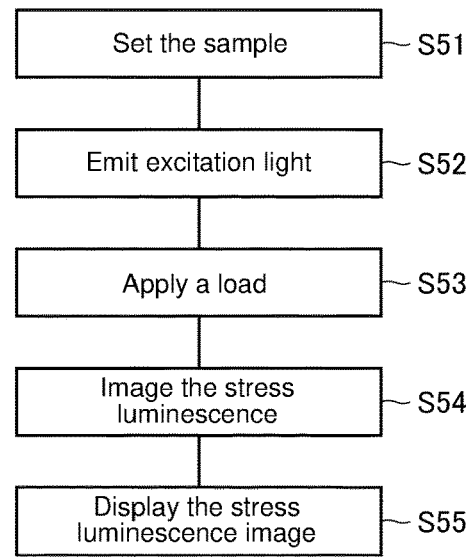
FIG. 12 is a flowchart for explaining the measurement step (S50).

FIG. 12 is a flowchart for describing the measurement step (S50). As shown in FIG. 12, the measurement step (S50) mainly includes a step (S51) of setting the sample, a step (S52) of emitting excitation light, a step (S53) of applying a load, a step (S54) of imaging the stresses luminescence, and a step (S55) of displaying the luminescence intensity distribution.

First, a step (S511) of setting the sample is performed. In this step (S511), the sample 1 is set to the holder 40 in a state of being bent in a U-shape. The first end 1c and the second end 1d of the sample 1 in the X-axis direction are supported by the fixed wall 42 and the moving wall 41 of the holder 40, respectively. The stress-luminescent body 2 is arranged above the predetermined region of the first surface 1a of the sample 1.

Next, a step (S512) of emitting excitation light is performed. In this step (S512), the controller 70 causes the light source 50 to irradiate the first surface 1a of the sample 1 with the excitation light from the light source 50. The stress-luminescent body 2 is excited by irradiating the stress-luminescent body 2 arranged at the predetermined region of the first surface 1a of the sample 1 with excitation light.

Next, a step (S53) of applying a load is performed. In this step (S53), the controller 70 drives the actuator 46 included in the first driver 45 to move the moving wall 41 of the holder 40 from the first holder position to the second holder position, thereby causing the sample 1 to transition from the first bending state to the second bending state. With this, a bending load is applied to the sample 1 and the luminescence film.

Next, a step (S54) of imaging the stresses luminescence is performed. In this step (S54), the camera 60 images the predetermined region (including the central part of the bending) of the sample 1. That is, the camera 60 images the luminescence of the stress-luminescent body 2. The controller 70 causes the camera 60 to mage the luminescence of the stress-luminescent body 2 on the first surface 1a of the sample 1.

In the step (S53), the moving wall 41 is repeatedly moved at a constant cycle (operation cycle of the first driver 45), whereby the repetitive load can be applied to the sample 1. Then, in the step (S54), the luminescence of the stress-luminescent body 2 during the repetitive operation is imaged by the camera 60, whereby the durability against the repetitive load applied to the sample 1 can be evaluated.

Figure 13:
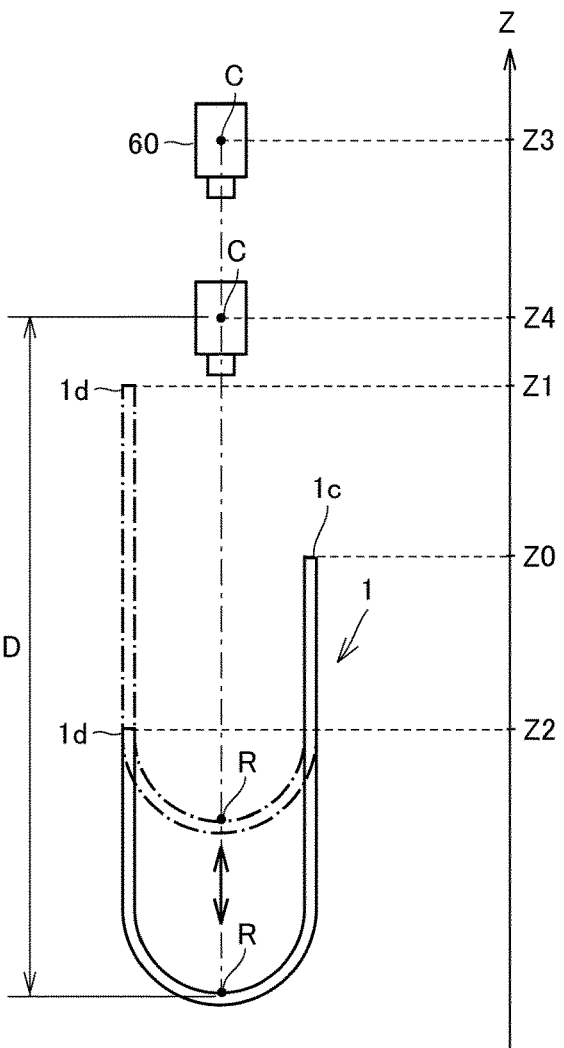
FIG. 13 is a schematic diagram for explaining the step (S54) shown in FIG. 12.

Here, when the moving wall 41 of the holder 40 is moved in the Z-axis direction, as shown in FIG. 13, the second end 1d of the sample 1 moves in the Z-axis direction, and therefore, the central part of the bending of the sample 1 also moves in the Z-axis direction. Specifically, as the second end 1d of the sample 1 is moved downward in the Z-axis direction, the central part of the bending moves along the Z-axis direction away from the camera 60. On the other hand, when the second end 1d of the sample 1 is moved upward in the Z-axis direction, the central part of the bending moves along the Z-axis direction toward the camera 60.

Therefore, in a case where the position of the camera 60 is fixed, the relative position of the camera 60 and the predetermined region fluctuates in accordance with the movement of the sample 1 in the predetermined region. Consequently, the distance between the camera 60 and at least one point of the predetermined region will also vary. In this case, since the focus position of the camera 60 is fixed, when the distance between the camera 60 and the at least one point varies, the camera 60 cannot focus on the at least one point, and consequently it is difficult to obtain an image focused on the at least one point.

Therefore, in the step (S54), the controller 70 controls at least one of the first driver 45 and the second driver 62 to maintain the focus position of the camera 60 at at least one point of the sample 1 in the predetermined region. As one aspect of such a control, the controller 70 controls the second driver 62 to maintain the focus position of the camera 60 at at least one point of the sample 1 in the predetermined region. Specifically, it is configured such that the second driver 62 causes the camera 60 to move depending on the movement of the sample 1 in the predetermined region in accordance with the command received from the controller 70, to thereby maintain the focus position of the camera 60 at at least one point in the predetermined region.

Next, a step (S55) of displaying the stress luminescence image is performed. In this step (S55), the controller 70 measures the luminescence intensity distribution in the predetermined region of the first surface 1a of the sample 1 by performing a known imaging process on image data by imaging by the camera 60. The controller 70 can display the image showing the captured image by the camera 60 and the distribution of the measured luminescence intensity on the display 80 (see FIG. 11).

Figure 14:
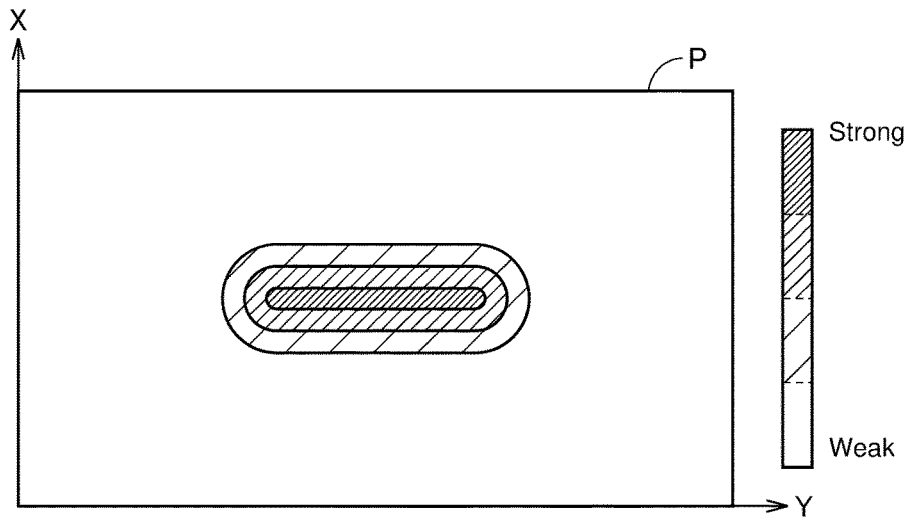
FIG. 14 is an example of an image showing a luminescence intensity distribution of in a predetermined region of a sample.

FIG. 14 is one example of an image showing the distribution of the luminescence intensity in the predetermined region of the sample 1. The image P shown in FIG. 13 is a colored representation of the luminescence intensity on a two-dimensional plane. The image P of FIG. 14 is also referred to as "color map."

On the right side of FIG. 14, a color bar indicating the range of colors assigned according to the luminescence intensity is shown. The color bar is divided into a plurality of segments between the maximum intensity "strong" and the minimum intensity "weak" of the luminescence intensity, and different colors are set for the plurality of segments. The image P shown in FIG. 13 are color-coded according to the luminescence intensity according to the color bars.

In FIG. 14, although an example is shown in which a color map in which the luminescence intensity is expressed by colors, the controller 70 can also generate an image showing the distribution of the luminescence intensity in a gray scale in which the intensity of luminescence intensity is expressed only by white, black, and a plurality of intermediate levels of gray. In this case, gray colors of different gradations are set between the plurality of segments. Alternatively, the controller 70 may generate a three-dimensional image showing a luminescence intensity distribution.

According to the image P showing the distribution of the luminescence intensity shown in FIG. 14, the distribution of the stresses (strains) in the predetermined region of the sample 1 can be known. Specifically, the portion of the image P where the luminescence intensity is strong indicates a portion where the stress (strain) is large, and the portion where the luminescence intensity is weak indicates a portion where the stress (strain) is small. The controller 70 can generate an image showing the distribution of the strain occurring in the predetermined region of the sample 1 based on the distribution of the luminescence intensity, based on the correlation between the luminescence intensity determined in advance and the stress.

[Aspect]

It will be appreciated by those skilled in the art that the embodiments described above are illustrative of the following aspects.

(Item 1)

A method of producing a stress-luminescent material according to one aspect of the present invention, comprising:

a preparation step of preparing a stress-luminescent material comprising monoclinic particles with stress luminescence; and a pulverization step of pulverizing the stress-luminescent material while maintaining a crystal structure of particles.

According to the method of producing a stress-luminescent material as recited in the above-described Item 1, the pulverized particles have a monoclinic crystal structure and are not impaired in its luminescence ability. Further, in the pulverized stress-luminescent material, aggregation of stress-luminescent particles is suppressed. Therefore, by using this stress-luminescent material, it is possible to produce a stress-luminescent body in which stress-luminescent particles are uniformly dispersed.

(Item 2)

The method of producing the stress-luminescent material as recited in the above-described Item 1, wherein the pulverization step includes:

a step of storing the stress-luminescent material prepared in the preparation step in a chamber together with a pulverizing media; and a step of circulating the stress-luminescent material and the pulverizing media in the chamber.

With this, stress-luminescent particles can be pulverized while maintaining the crystal structure. Further, it is possible to suppress deterioration of the stress-luminescent particles during pulverization.

(Item 3)

The method of producing the stress-luminescent material as recited in the above-described Item 1, wherein the pulverization step includes:

a step of storing the stress-luminescent material prepared in the preparation step in a mill; and a step of forming a concentric swirling vortex of a high-pressure jet stream within the mill.

With this, the stress-luminescent particles can be pulverized while maintaining the crystal structure. Further, it is possible to suppress deterioration of the stress-luminescent particles during pulverization.

(Item 4)

The method of producing the stress-luminescent material as recited in the above-described Item 1, further comprising:

a step of measuring a particle size distribution of the stress-luminescent material, wherein the pulverization step includes a step of pulverizing the stress-luminescent material until an average particle diameter determined from the measured particle size distribution becomes within a threshold range.

With this, a stress-luminescent body having a highly uniform film thickness of 10 $\mu$m or less can be produced.

(Item 5)

The method of producing a stress-luminescent material as recited in the above-described Item 4, wherein the pulverization step includes a step of setting the threshold range to a 100 nm to 900 nm.

With this, a stress-luminescent body having a uniform film thickness of 2 $\mu$m or less can be produced.

(Item 6)

A method of producing a stress-luminescent material according to one aspect of the present invention, comprising:

a step of preparing a stress-luminescent material comprising monoclinic particles with luminescence capability;

a step of pulverizing the stress-luminescent material while maintaining a crystal structure of the particles; and a step of blending the pulverized stress-luminescent material and a solvent.

According to the method of producing a stress-luminescent body as recited in the above-described Item 6, it is possible to obtain a mixture in which pulverized stress-luminescent materials are uniformly dispersed in a solvent. By using this mixture, a stress-luminescent body that exhibits uniform and high-stress luminescence capability can be produced. For example, on the surface of a sample having a film thickness of several tens of $\mu$m, a sample having a film thickness of $\frac{1}{5}$ or less of the film thickness of the stress-luminescent body can be uniformly formed, so that the strain generated in the sample can be accurately measured.

(Item 7)

The method of producing a stress-luminescent body as recited in the above-described Item 6, further comprising:

a step of forming the stress-luminescent body on the surface of the sample by applying a mixture of the stress-luminescent material and the solvent on the surface of a sample;

wherein the step of forming the stress-luminescent body includes:

an arrangement step of arranging a plate-like body on the surface of the sample, the plate-like body having a plurality of through-holes penetrating in a thickness direction, the plurality of through-holes being arranged in a mesh shape;

a step of filling the mixture in the plurality of through-holes by applying the mixture on the plate-like body;

a step of transferring the mixture to the surface of the sample; and a step of drying the mixture.

According to this, it is possible to easily form a stress-luminescent body having a uniform film thickness on the surface of the sample by performing a step of applying a stress-luminescent coating material to the surface of the sample using a plate-like body having a mesh-like structure.

(Item 8)

The method of producing a stress-luminescent body as recited in the above-described Item 7, wherein the arrangement step includes a step of setting at least one of a thickness and an aperture ratio of a plate-like body based on a target value of a film thickness of the stress-luminescent body.

With this, a film thickness of a stress-luminescent body formed on the surface of the sample can be easily adjusted by the thickness of the plate-like body and the aperture ratio.

(Item 9)

The method of producing a stress-luminescent body as recited in the above-described Item 8, wherein the arrangement step includes a step of setting a thickness of the plate-like body to 6 $\mu$m or less.

With this, a stress-luminescent body having a uniform film thickness of 2 $\mu$m or less can be formed on the sample.

(Item 10)

A stress-luminescent body according to any one of the above-described Items 7 to 9, further comprising a step of inspecting a sample on film thickness of stress-luminescent body. With this, the uniformity of the film thickness of the stress-luminescent body can be ensured.

(Item 11)

The method of producing a stress-luminescent body as recited in any one of the above-described Items 7 to 9, further comprising:

a step of inspecting a film thickness of the stress-luminescent body arranged on the surface of the sample.

According to the strain measurement method as recited in the above-described Item 11, it is possible to accurately measure the stress (strain) generated in the sample, based on the stress luminescence phenomenon of the stress-luminescent body having a uniform film thickness.

(Item 12)

A strain measurement method as recited in the above-described Item 11, wherein the measuring step includes a step of irradiating the stress-luminescent body with excitation light, a step of applying a load to the sample;

a step of imaging luminescence of the stress-luminescent body when a load is applied to the sample; and a step of displaying a stress luminescence image on a display.

With this, it is possible to accurately measure the stress (strain) generated in the sample from the stress luminescence image displayed on the display.

(Item 13)

A stress-luminescent body composed of a mixture of a stress-luminescent material and a solvent, wherein the stress-luminescent material includes monoclinic particles comprising a stress-to-stress luminescence ability, the monoclinic particles being pulverized while maintaining a crystal structure.

According to the stress-luminescent body as recited in the above-described Item 13, the pulverized particles have a monoclinic crystal structure and are not impaired in its luminescence ability. Further, aggregation of the pulverized particles is suppressed. Therefore, it is possible to form a stress-luminescent body in which stress-luminescent particles are uniformly dispersed in a mixture and exhibits a satisfactory stress/stress luminescence ability.

(Item 14)

A stress-luminescent coating material in which particles of stress-luminescent materials are dispersed in a base material, wherein the average particle diameter is 100 nm to 900 nm.

According to the stress-luminescent coating material as recited in the above-described Item 14, a stress-luminescent body having a film thickness of 2 μm or less can be formed on the sample.

(Item 15)

The stress-luminescent coating material as recited in the above-described Item 14, wherein a blending ratio of the stress-luminescent material in the stress-luminescent coating material is 20 weight % or more.

With this, it is possible to form a stress-luminescent body having a film thickness of 2 μm or less on the sample and excellent in the stress luminescence ability.

(Item 16)

A production equipment of a stress-luminescent body, comprising:

a base on which a sample is mounted;

a frame secured to the base opposite the surface of the sample; and a plate-like body stretched over the frame, wherein in the plate-like body, a plurality of through-holes penetrating in a thickness direction are arranged in a mesh shape, a squeegee having a flat plate-like shape, a lower end portion of which is configured to be movable horizontally on the plate-like body while being linearly abutted against plate-like body;

a supply member configured to feed a stress-luminescent coating material onto a plate-like body in a traveling direction.

According to the device of producing a stress-luminescent body as recited in the above-described Item 16, it is possible to easily form a sample having a uniform film thickness.

It is to be understood that embodiment disclosed herein is illustrative and not restrictive in all respects. The scope of the present invention is indicated by claim rather than by the above-described embodiment, and is intended to include all modifications within the meaning and scope equivalent to claim.

DESCRIPTION OF SYMBOLS

1: Sample

2: Stress-luminescent body

10: Screen plate (plate-like body)

11: Through-hole

12, 14: Frame

16: Base

18: Boss

20: Hinge

22: Squeegee

23: Rotating member

24: Stress-luminescent coating material

26: Nozzle

30: Particles

32: Solvent

40: Holder

41: Moving wall

42: Fixed wall

43, 44: Connection member

45: First driver

46: Actuator

50: Light source

52: Third driver

60: Camera

62: Second driver

70: Controller

80: Display

90: Operation unit

100: Stress luminescence measurement device

701: Processor

702: Memory

703: Input/output I/F

704: Communication I/F

The invention claimed is:

1. A method of producing a stress-luminescent material, comprising:

a preparation step of preparing a stress-luminescent material including monoclinic particles having a stress luminescence ability and that are in powder form with an average particle diameter of between 2 and 3 μm; and a pulverization step of pulverizing the stress-luminescent material including the monoclinic particles in powder form with an average particle diameter of between 2 and 3 μm while maintaining a crystal structure of the monoclinic particles.

2. The method of producing a stress-luminescent material as recited in claim 1, wherein the pulverization step includes:

a step of storing the stress-luminescent material prepared in the preparation step in a chamber together with a pulverizing media; and a step of circulating the stress-luminescent material and the pulverizing media in the chamber.

3. The method of producing a stress-luminescent material as recited in claim 1, wherein the pulverization step includes:

a step of storing the stress-luminescent material prepared in the preparation step in a mill; and a step of forming a concentric swirling vortex by a high-pressure jet stream in the mill.

4. The method of producing a stress-luminescent material as recited in claim 1, further comprising:

a step of measuring a particle size distribution of the stress-luminescent material, wherein the pulverization step includes a step of pulverizing the stress-luminescent material until an average particle diameter determined from the measured particle size distribution falls within a threshold range.

5. The method of producing a stress-luminescent material as recited in claim 4, wherein the pulverization step includes a step of setting the threshold range to a 100 nm to 900 nm.

6. The method of producing a stress-luminescent material as recited in claim 1, wherein the monoclinic particles have a particle size distribution from 1 μm to 10 μm.

7. The method of producing a stress-luminescent material as recited in claim 1, wherein preparing a stress-luminescent material including monoclinic particles having a stress luminescence ability and that are in powder form with an average particle diameter of between 2 and 3 μm comprises synthesizing the stress-luminescent material to have an average particle diameter of between 2 and 3 μm.

8. The method of producing a stress-luminescent material as recited in claim 1, wherein preparing a stress-luminescent material including monoclinic particles having a stress luminescence ability and that are in powder form with an average particle diameter of between 2 and 3 μm comprises providing stress-luminescent material synthesized to have an average particle diameter of between 2 and 3 μm.

9. A method of producing a stress-luminescent body, comprising:

a step of preparing a stress-luminescent material including monoclinic particles having a stress luminescence ability and that are in powder form with an average particle diameter of between 2 and 3 μm;

a step of pulverizing the stress-luminescent material including the monoclinic particles in powder form with an average particle diameter of between 2 and 3 μm while maintaining a crystal structure of the monoclinic particles; and a step of blending the pulverized stress-luminescent material and a solvent.

10. The method of producing a stress-luminescent body as recited in claim 9, further comprising:

a step of forming the stress-luminescent body on a surface of a sample by applying a mixture of the stress-luminescent material and the solvent on the surface of the sample;

wherein the step of forming the stress-luminescent body includes:

an arrangement step of arranging a plate-like body on the surface of the sample, the plate-like body having a plurality of through-holes penetrating in a thickness direction, the plurality of through-holes being arranged in a mesh shape;

a step of filling the mixture in the plurality of through-holes by applying the mixture on the plate-like body;

a step of transferring the mixture to the surface of the sample; and a step of drying the mixture.

11. The method of producing a stress-luminescent body as recited in claim 10, wherein the arrangement step includes a setting step of setting at least one of a thickness and an aperture ratio of the plate-like body, based on a target value of a film thickness of the stress-luminescent body.

12. The method of producing a stress-luminescent body as recited in claim 11, wherein the setting step includes a step of setting a thickness of the plate-like body to 6 μm or less.

13. The method of producing a stress-luminescent body as recited in claim 10, further comprising:

a step of inspecting a film thickness of the stress-luminescent body arranged on the surface of the sample.

14. A strain measurement method comprising:

a measurement step of measuring strain of a stress-luminescent body produced by the method of producing a stress-luminescent body as recited in claim 10.

15. The strain measurement method as recited in claim 14, wherein the measurement step includes:

a step of irradiating the stress-luminescent body with excitation light;

a step of applying a load to the sample;

a step of imaging luminescence of the stress-luminescent body when the load is applied to the sample; and a step of displaying a stress luminescence image on a display.

* * * * *